(12) United States Patent
Ujiie

(10) Patent No.: US 11,195,442 B2
(45) Date of Patent: Dec. 7, 2021

(54) SCREEN GENERATION DEVICE AND SCREEN GENERATION METHOD

(71) Applicant: MITSUBISHI ELECTRIC CORPORATION, Tokyo (JP)

(72) Inventor: Junya Ujiie, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/051,005

(22) PCT Filed: Jul. 19, 2018

(86) PCT No.: PCT/JP2018/027084
§ 371 (c)(1),
(2) Date: Oct. 27, 2020

(87) PCT Pub. No.: WO2020/016990
PCT Pub. Date: Jan. 23, 2020

(65) Prior Publication Data
US 2021/0142705 A1 May 13, 2021

(51) Int. Cl.
*G09G 3/02* (2006.01)
*G06F 9/50* (2006.01)
(52) U.S. Cl.
CPC .......... *G09G 3/02* (2013.01); *G06F 9/50* (2013.01); *G09G 2330/021* (2013.01); *G09G 2370/045* (2013.01)
(58) Field of Classification Search
CPC .......... G09G 3/02; G09G 2230/021; G09G 2370/045; G06F 9/50
See application file for complete search history.

(56) References Cited

U.S. PATENT DOCUMENTS

| 8,073,265 | B2* | 12/2011 | Liao ............... G06F 16/50 382/225 |
| 10,205,501 | B2* | 2/2019 | Chen ............... H04J 13/0003 |
| 10,586,515 | B2* | 3/2020 | Fujiwara ............ H04N 5/265 |
| 2020/0065671 | A1* | 2/2020 | Sahni ............... G06N 3/0454 |

FOREIGN PATENT DOCUMENTS

JP  2009-245265 A  10/2009

OTHER PUBLICATIONS

International Saerch Report, issued in PCT/JP2018/027084, dated Oct. 9, 2018.

* cited by examiner

*Primary Examiner* — Bryan Earles
(74) *Attorney, Agent, or Firm* — Birch, Stewart, Kolasch & Birch, LLP

(57) ABSTRACT

An object is to provide a technique capable of reducing an inter-SoC communication volume. The screen generation device includes a first SoC, a second SoC, and an allocation unit. The allocation unit defines a plurality of superposition sequence layers having a superposition sequence and selected from the plurality of first drawing layers and the plurality of second drawing layers, allocates, among the plurality of superposition sequence layers, a consecutive superposition sequence layer cluster being consecutive two or more superposition sequence layers in the superposition sequence, to the first SoC, and allocates remaining superposition sequence layers being one or more superposition sequence layers other than the consecutive superposition sequence layer cluster to the second SoC.

6 Claims, 18 Drawing Sheets

FIG. 2

| LAYER NUMBER OF SUPERPOSITION SEQUENCE LAYER (SUPERPOSITION SEQUENCE) | LAYER NUMBER OF FIRST DRAWING LAYER | LAYER NUMBER OF SECOND DRAWING LAYER |
|---|---|---|
| 1(1) | 1 | 1 |
| 2(2) | 2 | 2 |
| 3(3) | 3 | 3 |
| 4(4) | 4 | 4 |
| 5(5) | 5 | 5 |
| 6(6) | 6 | 6 |
| 7(7) | 7 | 7 |
| 8(8) | 8 | 8 |

FIG. 3

| LAYER NUMBER OF SUPERPOSITION SEQUENCE LAYER (SUPERPOSITION SEQUENCE) | SoC NUMBER |
|---|---|
| 1(1) | 2 |
| 2(2) | 2 |
| 3(3) | 2 |
| 4(4) | 2 |
| 5(5) | 1 |
| 6(6) | 1 |
| 7(7) | 1 |
| 8(8) | 1 |

F I G. 4

| LAYER NUMBER OF SUPERPOSITION SEQUENCE LAYER (SUPERPOSITION SEQUENCE) | SoC NUMBER |
|---|---|
| 1(1) | 2 |
| 2(2) | 2 |
| 3(3) | 2 |
| 4(4) | 1 |
| 5(5) | 1 |
| 6(6) | 1 |
| 7(7) | 1 |
| 8(8) | 2 |

F I G. 6

| LAYER NUMBER OF FIRST DRAWING LAYER | LAYER NUMBER OF SECOND DRAWING LAYER | SoC NUMBER/USAGE |
|---|---|---|
| 1 | 1 | INVALID VALUE (UNUSED) |
| 2 | 2 | 2 |
| 3 | 3 | INVALID VALUE (UNUSED) |
| 4 | 4 | 2 |
| 5 | 5 | INVALID VALUE (UNUSED) |
| 6 | 6 | 1 |
| 7 | 7 | INVALID VALUE (UNUSED) |
| 8 | 8 | 1 |

FIG. 8

| LAYER NUMBER OF SUPERPOSITION SEQUENCE LAYER (SUPERPOSITION SEQUENCE) | SoC NUMBER |
|---|---|
| 2(1) | 2 |
| 4(2) | 2 |
| 6(3) | 1 |
| 7(4) | 2 |
| 8(5) | 1 |

FIG. 9

| LAYER NUMBER OF SUPERPOSITION SEQUENCE LAYER (SUPERPOSITION SEQUENCE) | SoC NUMBER |
|---|---|
| 2(1) | 2 |
| 4(2) | 2 |
| 6(3) | 1 |
| 7(4) | <u>1</u> |
| 8(5) | 1 |

FIG. 13

| LAYER NUMBER OF SUPERPOSITION SEQUENCE LAYER (SUPERPOSITION SEQUENCE) | SoC NUMBER |
|---|---|
| 1(1) | 2 |
| 2(2) | 1A |
| 3(3) | 1A |
| 4(4) | 1A |
| 5(5) | 2 |
| 6(6) | 1B |
| 7(7) | 1B |
| 8(8) | 2 |

FIG. 14

| LAYER NUMBER OF SUPERPOSITION SEQUENCE LAYER (SUPERPOSITION SEQUENCE) | SoC NUMBER |
|---|---|
| 2(1) | 2 |
| 4(2) | 2 |
| 5(3) | 1 |
| 6(4) | 1 |
| 8(5) | 1 |

F I G. 15

| LAYER NUMBER OF SUPERPOSITION SEQUENCE LAYER (SUPERPOSITION SEQUENCE) | SoC NUMBER |
|---|---|
| 2(1) | 2 |
| 4(2) | 2 |
| 5(3) | 2 |
| 6(4) | 1 |
| 8(5) | 1 |

FIG. 16

| LAYER NUMBER OF SUPERPOSITION SEQUENCE LAYER (SUPERPOSITION SEQUENCE) | LAYER NUMBER OF FIRST DRAWING LAYER | LAYER NUMBER OF SECOND DRAWING LAYER | SoC NUMBER/USAGE |
|---|---|---|---|
| 1(1) | – | 1 | 2 |
| 2(2) | – | 2 | 2 |
| | – | 3 | INVALID VALUE (UNUSED) |
| | – | 4 | INVALID VALUE (UNUSED) |
| | – | 5 | INVALID VALUE (UNUSED) |
| 6(3) | – | 6 | 2 |
| 7(4) | – | 7 | 2 |
| – | – | 8 | (SUPERPOSITION RESULT IN FIRST SoC) |
| 8(5) | 1 | – | 1 |
| 9(6) | 2 | – | 1 |
| 10(7) | 3 | – | 1 |
| | 4 | – | INVALID VALUE (UNUSED) |
| | 5 | – | INVALID VALUE (UNUSED) |
| | 6 | – | INVALID VALUE (UNUSED) |
| 14(8) | 7 | – | 1 |
| 15(9) | 8 | – | 1 |

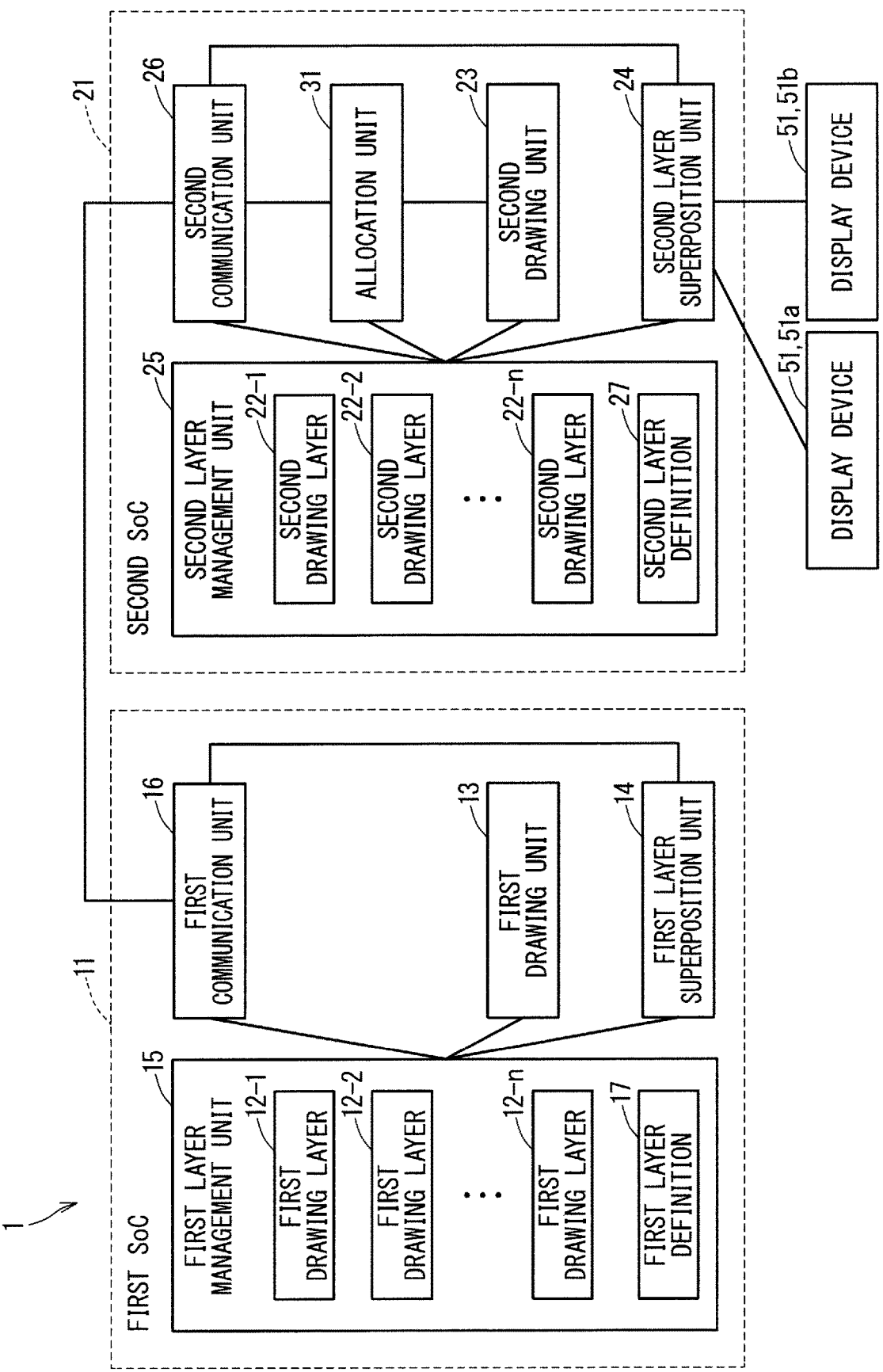

F I G. 1 8

| LAYER NUMBER OF FIRST DRAWING LAYER | LAYER NUMBER OF SECOND DRAWING LAYER | SoC NUMBER/USAGE | DISPLAY DEVICE NUMBER |
|---|---|---|---|
| 1 | 1 | INVALID VALUE (UNUSED) | |
| 2 | 2 | 2 | 51A, 51B |
| 3 | 3 | 2 | 51A, 51B |
| 4 | 4 | 2 | 51A, 51B |
| 5 | 5 | INVALID VALUE (UNUSED) | |
| 6 | 6 | 1 | 51A |
| 7 | 7 | INVALID VALUE (UNUSED) | |
| 8 | 8 | 1 | 51A |

SCREEN GENERATION DEVICE AND SCREEN GENERATION METHOD

TECHNICAL FIELD

The present invention relates to a screen generation device and a screen generation method for generating an output screen which is a screen output to a display device.

BACKGROUND ART

A screen generation device that generates a screen displayed on a display device is applied to in-vehicle information equipment and the like. The screen generation devices include a plurality of System on Chips (SoCs) that function as a plurality of processors for improving the calculation capability. In such a screen generation device, the memory space of each SoC is individually provided, and the data generated and processed in the memory space of one SoC is configured to be transmitted to another SoC via the inter-SoC communication. At this point, the SoC to which the data for executing the process (task) is to be transmitted is selected from the plurality of SoCs so that the plurality of SoCs can be used appropriately.

For example, in Patent Document 1, a screen generation device has been proposed which draws a map screen with the map screen divided into drawing targets using a plurality of processor cores, and selects a processor core based on restriction conditions regarding superposition of drawing targets.

PRIOR ART DOCUMENTS

Patent Documents

[Patent Document 1] Japanese Patent Application Laid-Open No. 2009-245265

SUMMARY

Problem to be Solved by the Invention

However, in the above configuration, when the inter-SoC communication volume becomes larger, the process waiting time becomes longer. Therefore, there has been a problem that the response time to the user operation takes long, for example.

The present invention has been made in view of the above problem and has an object to provide a technique capable of reducing the inter-SoC communication volume.

Means to Solve the Problem

The screen generation device according to the present invention is a screen generation device configured to generate an output screen which is a screen output to a display device. The screen generation device includes at least one first SoC including a plurality of first drawing layers for drawing a screen being a part of the output screen, a second SoC including a plurality of second drawing layers for drawing a screen being a part of the output screen and configured to be capable of communication with the at least one first SoC, and an allocation unit configured to define a plurality of superposition sequence layers having a superposition sequence and selected from the plurality of first drawing layers and the plurality of second drawing layers, allocate, among the plurality of superposition sequence layers, a consecutive superposition sequence layer cluster being consecutive two or more superposition sequence layers in the superposition sequence, to the first SoC, and allocate remaining superposition sequence layers being one or more superposition sequence layers other than the consecutive superposition sequence layer cluster to the second SoC. The at least one first SoC includes a first drawing unit configured to draw a screen on two or more first drawing layers of the first SoC to which the consecutive superposition sequence layer cluster is allocated, and a first layer superposition unit configured to superpose the two or more first drawing layers drawn by the first drawing unit. The second SoC includes a second drawing unit configured to draw a screen on one or more second drawing layers of the second SoC to which the remaining superposition sequence layers are allocated, and a second layer superposition unit configured to generate the output screen by superposing a superposition result in the first SoC transmitted from the at least one first SoC via the communication and the one or more second drawing layers drawn by the second drawing unit.

Effects of the Invention

According to the present invention, the output screen is generated by allocating, among the plurality of superposition sequence layers, a consecutive superposition sequence layer cluster being consecutive two or more superposition sequence layers in the superposition sequence, to the first SoC, allocating remaining superposition sequence layers being one or more superposition sequence layers other than the consecutive superposition sequence layer cluster to the second SoC, the first SoC drawing a screen on two or more first drawing layers of the first SoC to which the consecutive superposition sequence layer cluster is allocated, superimposing the two or more drawn first drawing layers, the second SoC drawing the screen on one or more second drawing layers of the second SoC to which the remaining superposition sequence layer layers are allocated, and superposing a superposition result in the first SoC transmitted from the first SoC via the communication and the one or more drawn second drawing layers. According to such a configuration, the inter-SoC communication volume can be reduced.

The explicit purpose, feature, phase, and advantage of the present invention will be described in detail hereunder with attached drawings.

BRIEF DESCRIPTION OF DRAWINGS

FIG. 2: A table illustrating an example of a plurality of superposition sequence layers according to Embodiment 1.

FIG. 3: A table for illustrating allocation by an allocation unit according to Embodiment 1.

FIG. 4: A table for illustrating allocation by the allocation unit according to Embodiment 1.

FIG. 6: A table illustrating an example of layer definition according to Embodiment 2.

FIG. 8: A table for illustrating allocation by an allocation unit according to Embodiment 2.

FIG. 9: A table for illustrating the allocation by the allocation unit according to Embodiment 2.

FIG. 13: A table for illustrating allocation by an allocation unit according to Modification 1.

FIG. 14: A table for illustrating allocation by an allocation unit according to Modification 2.

FIG. 15: A table for illustrating the allocation by the allocation unit according to Modification 2.

FIG. 16: A table for illustrating allocation by the allocation unit according to Modification 4.

FIG. 17: A block diagram illustrating a configuration of a screen generation device according to Embodiment 3.

FIG. 18: A table illustrating an example of layer definition according to Embodiment 3.

DESCRIPTION OF EMBODIMENTS

Embodiment 1

Figure 1:
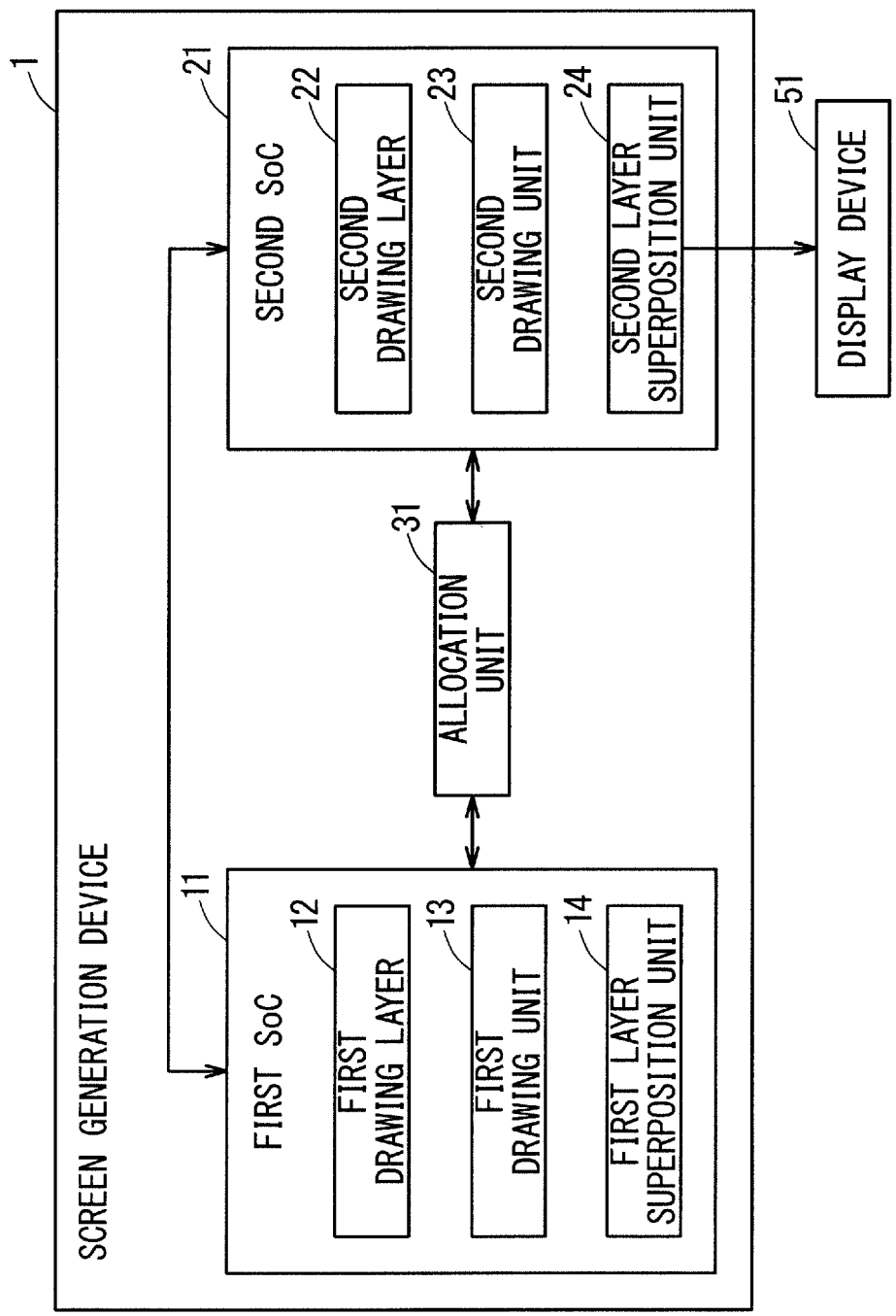
FIG. 1: A block diagram illustrating a configuration of a screen generation device according to Embodiment 1.

FIG. 1 is a block diagram illustrating a configuration of a screen generation device 1 according to Embodiment 1 of the present invention. The screen generation device 1 is a device that generates an output screen which is a screen output to a display device 51, and is applied to, for example, in-vehicle information equipment.

The screen generation device 1 of FIG. 1 includes a first SoC 11, a second SoC 21 connected to the display device 51, and an allocation unit 31. Although the number of the first SoCs 11 is one in FIG. 1, it may be plural as will be described later. Further, although the allocation unit 31 is arranged outside the second SoC 21 in FIG. 1, it may be provided in the second SoC 21.

The first SoC 11 includes a plurality of first drawing layers 12 for drawing a screen being a part of the output screen. Note that FIG. 1 illustrates only one of the plurality of first drawing layers 12. The second SoC 21 includes a plurality of second drawing layers 22 for drawing a screen being a part of the output screen. Note that FIG. 1 illustrates only one of the plurality of second drawing layers 22. In the following description, when the first drawing layer 12 and the second drawing layer are not distinguished, they may be referred to as "drawing layer". The drawing layer is a buffer used when superposing screens and the number of drawing layers is limited when an IP core specific to superposing processing in each SoC is used.

The second SoC 21 is capable of communication with the first SoC 11 and exchanges data with the first SoC 11. In the following description, the communication between the first SoC 11 and the second SoC 21 may be referred to as "inter-SoC communication".

The allocation unit 31 defines a plurality of superposition sequence layers having a superposition sequence and selected from the plurality of first drawing layers 12 and the plurality of second drawing layers 22. The superposition sequence layer is a layer for allocation by the allocation unit 31, and the screen does not need to be drawn on the superposition sequence layer itself.

FIG. 2 is a table illustrating an example of a plurality of superposition sequence layers. A layer number is a number for identifying a superposition sequence layer or a drawing layer.

In the example of FIG. 2, the plurality of superposition sequence layers are selected from all of the first drawing layers and the second drawing layers having the layer numbers "1s" to "8s". However, as will be described later, the plurality of superposition sequence layers may also be selected from some of the first drawing layers and the second drawing layers having the layer numbers "1s" to "8s".

Further, in the example of FIG. 2, each superposition sequence layer is selected from both the first drawing layers 12 and the second drawing layers 22. However, as will be described later, each of the plurality of superposition sequence layers may also be selected from either the first drawing layers or the second drawing layers.

In the following description, the superposition sequence of the plurality of superposition sequence layers is in the ascending order of the layer numbers of the plurality of superposition sequence layers, and the smaller the superposition sequence layer numbers, the upper layer the superposition sequence layers.

The allocation unit 31 allocates a plurality of superposition sequence layers whose superposition sequence is defined in advance to the first SoCs 11 and the second SoCs 21.

FIGS. 3 and 4 are tables for illustrating the allocation by the allocation unit 31.

In the examples of FIGS. 3 and 4, the SoC number "1s" are assigned in the superposition sequence layers allocated to the first SoCs 11. In the example of FIG. 3, the superposition sequence layers having the consecutive layer numbers "5" to "8" in the superposition sequence of FIG. 2 are allocated to the first SoC 11. In the example of FIG. 4, the superposition sequence layers having the consecutive layer numbers "4" to "7" in the superposition sequence of FIG. 2 are allocated to the first SoC 11. In this manner, the allocation unit 31 allocates, among the plurality of superposition sequence layers, a consecutive superposition sequence layer cluster being consecutive two or more superposition sequence layers in the superposition sequence, to the first SoC 11.

In the examples of FIGS. 3 and 4, the SoC number "2s" are assigned to the superposition sequence layers allocated to the second SoC 21. In the example of FIG. 3, the remaining superposition sequence layers having the layer numbers "1" to "4" other than the consecutive superposition sequence layer cluster are allocated to the second SoC 21. In the example of FIG. 4, the remaining superposition sequence layers having the layer numbers "1" to "3" and "8" other than the consecutive superposition sequence layer cluster are allocated to the second SoC 21. In this manner, the allocation unit 31 allocates, among the plurality of superposition sequence layers, remaining superposition sequence layers being one or more superposition sequence layers other than the consecutive superposition sequence layer cluster to the second SoC 21.

The first SoC 11 includes a plurality of first drawing layers 12, a first drawing unit 13, and a first layer superposition unit 14.

The first drawing unit 13 draws a screen on two or more first drawing layers 12 of the first SoC 11 to which the consecutive superposition sequence layer cluster is allocated. The first drawing unit 13 may draw in one program such as a map display program, or may draw in a plurality of programs.

The first layer superposition unit 14 superposes two or more first drawing layers 12 drawn by the first drawing unit 13. Hereinafter, the result obtained by the superposition will be referred to as the superposition result in the first SoC 11. The superposition result in the first SoC 11 is transmitted from the first SoC 11 to the second SoC 21 with inter-SoC communication.

The second SoC 21 includes a plurality of second drawing layers 22, a second drawing unit 23, and a second layer superposition unit 24.

The second drawing unit 23 draws a screen on one or more second drawing layers 22 of the second SoC 21 to which the remaining superposition sequence layers are allocated. The second drawing unit 23 may draw in one program such as a map display program, or may draw in a plurality of programs.

The second layer superposition unit 24 generates the output screen to be output to the display device 51 by superposing the superposition result in the first SoC 11 transmitted via the communication from the first SoC 11 and one or more second drawing layers 22 drawn by the second drawing unit 23.

Conclusion of Embodiment 1

In the configuration in which the first SoC 11 and the second SoC 21 cooperate to superpose a plurality of drawing layers in the superposition sequence, a configuration in which the first SoC 11 superposes two or more non-consecutive drawing layers in the superposition sequence is assumed. In such a configuration, in order for the superposition of two or more non-consecutive drawing layers in the superposition sequence to be performed, the necessary drawing layers must be exchanged between the first SoC 11 and the second SoC 21 before the superposition to arrange the drawing layers in the superposition sequence. For this reason, in such a configuration, inter-SoC communication is relatively large.

Whereas, in the screen generation device 1 according to Embodiment 1, the first SoC 11 superposes two or more first drawing layers 12 corresponding to the consecutive superposition sequence layer cluster in the superposition sequence; therefore, enabling to reduce volume of an inter-SoC communication as described above. Further in Embodiment 1, the second SoC 21 generates the output screen by superposing the superposition result in the first SoC 11 transmitted from the first SoC 11 via the communication and the one or more second drawing layers 22. Such a configuration enables the output screen to be directly output from the second SoC 21 to the display device 51, enabling to reduce unnecessary exchange of data.

Embodiment 2

Figure 5:
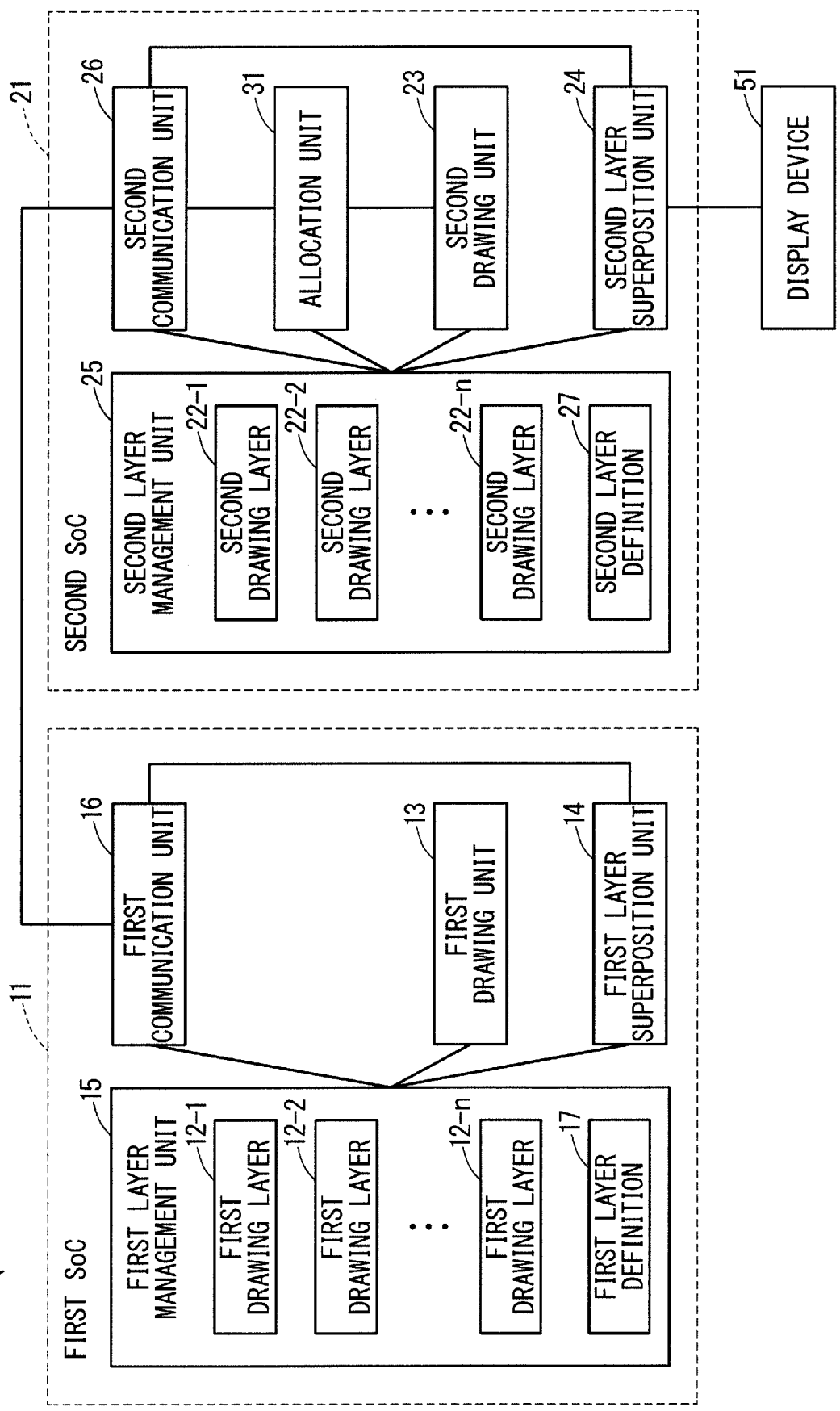
FIG. 5: A block diagram illustrating a configuration of a screen generation device according to Embodiment 2.

FIG. 5 is a block diagram illustrating a configuration of a screen generation device 1 according to Embodiment 2 of the present invention. Hereinafter, of the components according to Embodiment 2, the same or similar reference numerals are given to the same or similar components as those described above, and different components will be mainly described.

The first SoC 11 according to Embodiment 2 includes a first layer management unit 15 and a first communication unit 16 in addition to the first drawing unit 13 and the first layer superposition unit 14. The first drawing unit 13 and the first layer superposition unit 14 are the same as the first drawing unit 13 and the first layer superposition unit 14 described in Embodiment 1.

The first layer management unit 15 includes first drawing layers 12 (first drawing layers 12-1 to 12-*n*) of n(n≥2) and a first layer definition 17. The first drawing layers 12 are the same as the first drawing layers 12 described in Embodiment 1.

FIG. 6 is a table illustrating an example of layer definition (the first layer definition 17, a second layer definition 27) according to Embodiment 2. As illustrated in FIG. 6, the first layer definition 17 is information by which constituent elements provided in the first SoC 11 use the n first drawing layers 12 (n=8 in FIG. 6), and includes an entry composed of the layer numbers "1" to "n" and the SoC numbers "1s" and "2s".

Unlike the tables of the plurality of superposition sequence layers of FIGS. 3 and 4, in the table of the first layer definition 17 of FIG. 6, invalid values are set for the SoC numbers of the unused drawing layers. Of the drawing layers in FIG. 6, the drawing layers having the layer numbers "2", "4", "6", and "8" in use are selected as the plurality of superposition sequence layers in FIGS. 3 and 4. As the invalid value, for example, a value other than the SoC numbers "1" and "2" is used.

The first communication unit 16 is capable of communicating with the second SoC 21. The first communication unit 16 of the first SoC 11, that does not include the allocation unit 31, exchanges information necessary for executing the process with the allocation unit 31 included in the second SoC 21.

As illustrated in FIG. 5, the second SoC 21 according to Embodiment 2 includes a second layer management unit 25, a second communication unit 26, and the allocation unit 31 in addition to the second drawing unit 23 and the second layer superposition unit 24. The second drawing unit 23, the second layer superposition unit 24, and the allocation unit 31 are the same as the second drawing unit 23, the second layer superposition unit 24, and the allocation unit 31 described in Embodiment 1. The second layer management unit 25, the second communication unit 26, and the second layer definition 27 are the same as the first layer management unit 15, the first communication unit 16, and the first layer definition 17.

Operation

Figure 7:
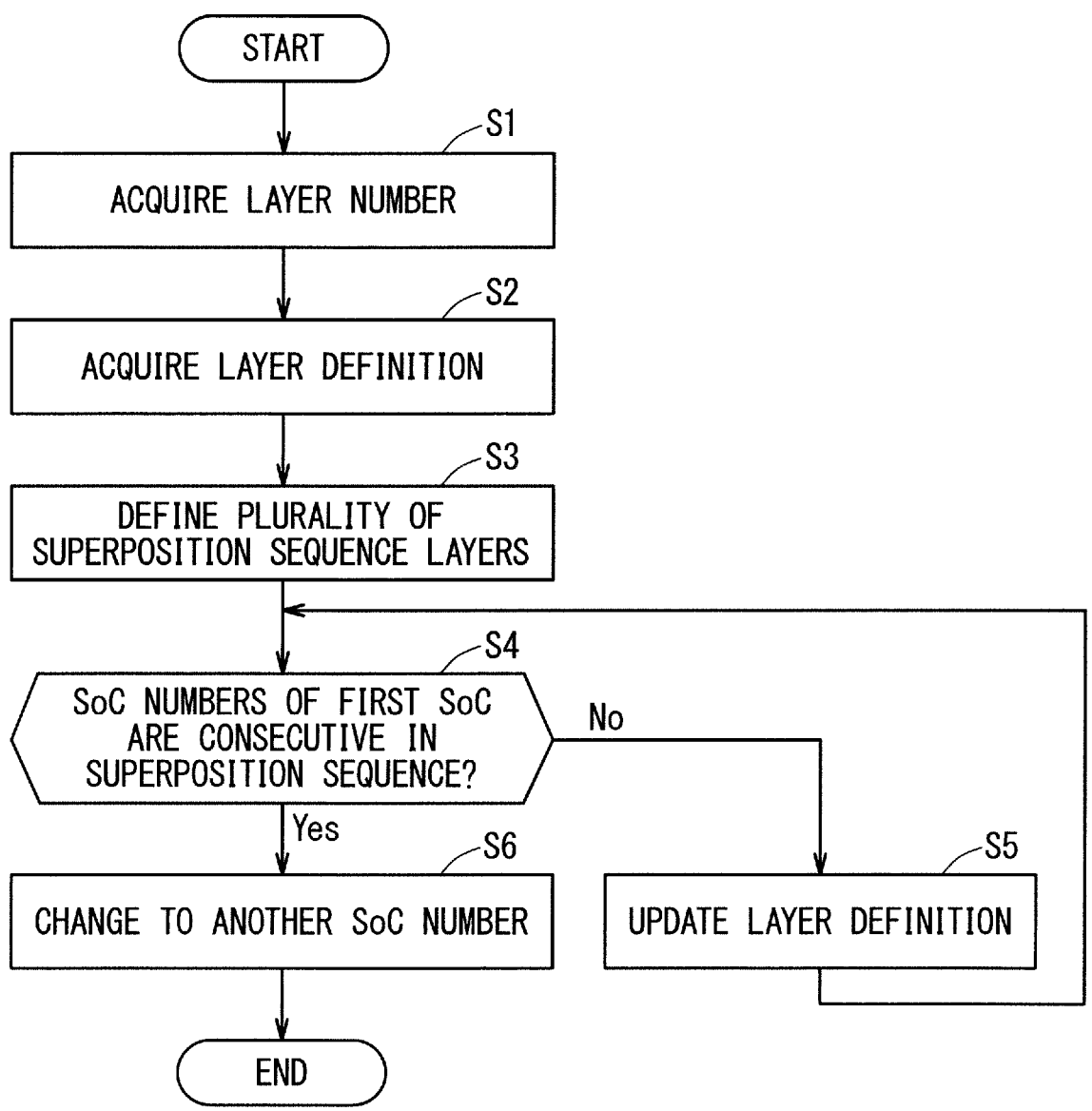
FIG. 7: A flowchart illustrating the operation of the screen generation device according to Embodiment 2.

FIG. 7 is a flowchart illustrating the operation of the allocation unit 31 according to Embodiment 2. Note that the process is started in the second SoC 21.

In Step S1, the allocation unit 31 acquires a layer number for a new process. In Step S2, the allocation unit 31 acquires a layer definition (the second layer definition 27). Hereinafter, an example in which the layer number "7" is acquired in Step S1 and the second layer definition 27 as illustrated in FIG. 6 is acquired in Step S2 will be described as appropriate.

In Step S3, the allocation unit 31 extracts the layer number and the SoC number of the drawing layer in use, based on the second layer definition 27 acquired in Step S2.

In addition, the allocation unit 31 adds the layer number acquired in Step S1 to the extracted layer number and the drawing layer and sets "2" to the SoC number corresponding to the layer number whereby defining a plurality of superposition sequence layers. For example, when the layer number "7" is acquired in Step S1 and the second layer definition 27 as illustrated in FIG. 6 is acquired in Step S2, a plurality of superposition sequence layers as illustrated in FIG. 8 are defined by Step S3. The superposition sequence of the plurality of superposition sequence layers in FIG. 8 is the order of the layer numbers "2", "4", "6", "7", and "8".

In Step S4, for the plurality of superposition sequence layers, the allocation unit 31 determines whether or not the SoC numbers of the first SoC 11 are consecutive in the superposition sequence of the plurality of superposition sequence layers. When it is determined that the SoC numbers of the first SoC 11 are consecutive, the process proceeds to Step S6, and when it is determined that they are non-consecutive, the process proceeds to Step S5.

In the plurality of superposition sequence layers of FIG. 8, the SoC numbers corresponding to the layer numbers "6", "7", and "8" are "1", "2", and "1". That is, in the plurality of superposition sequence layers in FIG. 8, the SoC numbers of the first SoC 11 are non-consecutive at the layer number "7" acquired in Step S1. Therefore, in the example of FIG. 8, the process proceeds to Step S5.

In Step S5, of the SoC numbers of the first SoC 11, the allocation unit 31 changes the SoC number non-consecutive in the superposition sequence to another SoC number. In Embodiment 2, the allocation unit 31 changes the SoC number of the first SoC 11 non-consecutive in the superposition sequence to "1". Thereafter, the process returns to Step S4.

For example, the plurality of superposition sequence layers in FIG. 8 are changed to the plurality of superposition sequence layers as illustrated in FIG. 9 in Step S5. That is, the SoC number corresponding to the layer number "7" acquired in Step S1 is set to "1". As a result, the SoC numbers of the first SoC 11 are consecutive in the layer numbers "6" to "8".

When the process proceeds from Step S4 to Step S6, the allocation unit 31 updates the layer definition (second layer definition 27) with the plurality of superposition sequence layers at this point. The first layer definition 17 and the second layer definition 27 are synchronized with each other, and the update of the second layer definition 27 updates the first layer definition 17 as well. Then, the operation of FIG. 7 ends.

After the operation of FIG. 7, the allocation unit 31 allocates the consecutive two or more superposition sequence layers in superposition sequence, such as the superposition sequence layers having the layer numbers "6" to "8" illustrated in the example of FIG. 9, to the first SoC 11 as the consecutive superposition sequence layer cluster. The allocation unit 31 allocates one or more superposition sequence layers other than the consecutive superposition sequence layer cluster, such as the superposition sequence layers having the layer numbers "2" and "4" in the example of FIG. 9, to the second SoC 21 as the remaining superposition sequence layers.

After the allocation by the allocation unit 31 is completed, information necessary for executing the process is exchanged between the first communication unit 16 of the first SoC 11 and the second communication unit 26 of the second SoC 21 based on the instruction of the allocation unit 31. Then, processes such as drawing are performed in the first SoC 11 and the second SoC 21. Next, the processes will be described.

Figure 10:
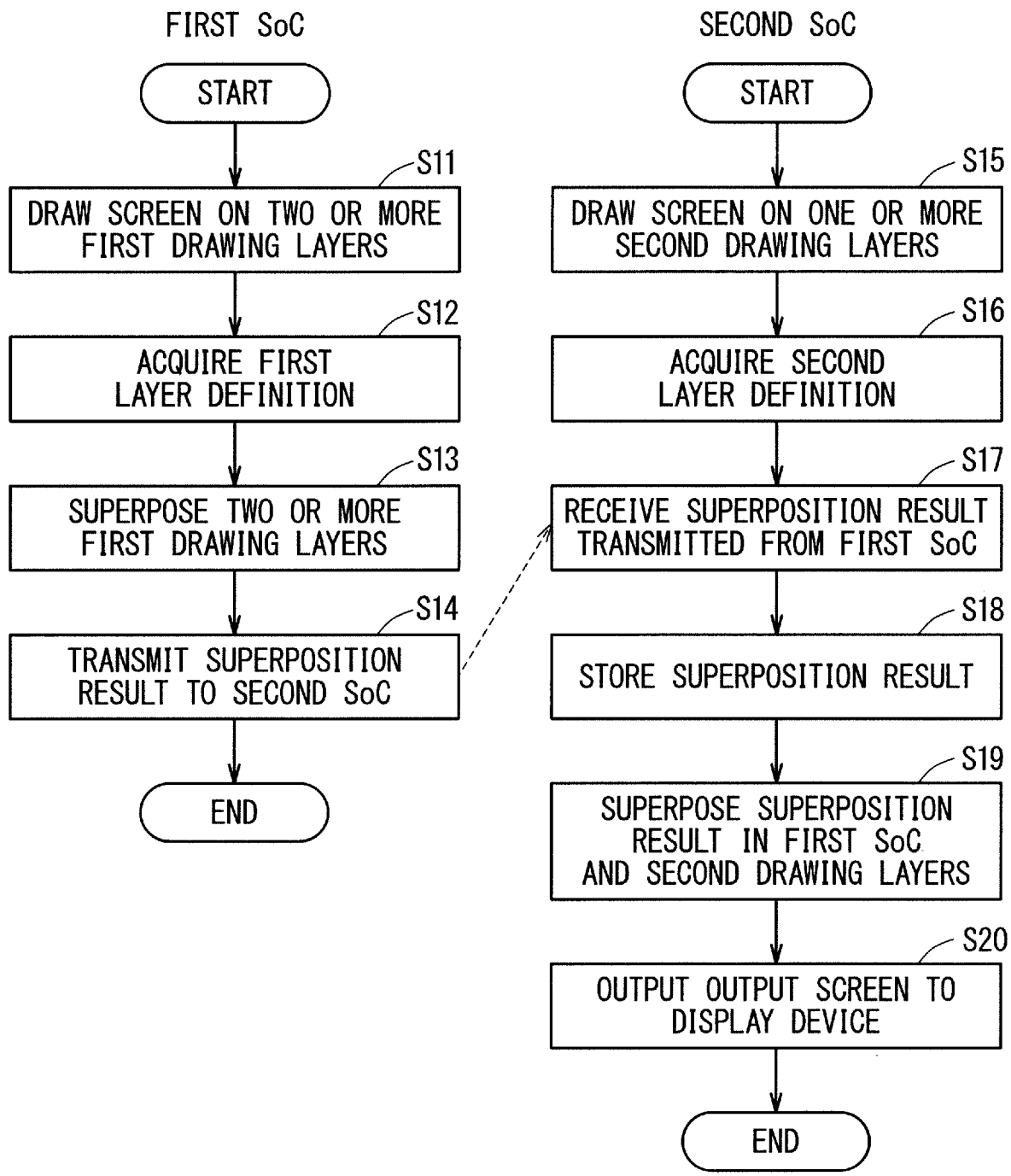
FIG. 10: A flowchart illustrating the operation of the screen generation device according to Embodiment 2.

FIG. 10 is a flowchart illustrating the operations of the first SoC 11 and the second SoC 21, specifically the processes such as drawing in the first SoC 11 and the second SoC 21. The operation of FIG. 10 is performed by each SoC at any time.

In Step S11, the first drawing unit 13 draws a screen on two or more first drawing layers 12 of the first SoC 11 to which the consecutive superposition sequence layer cluster is allocated. In Step S2, the first layer superposition unit 14 acquires the first layer definition 17 from the first layer management unit 15.

In Step S13, the first layer superposition unit 14 superimposes two or more drawn first drawing layers 12. In the example of FIG. 9, the first drawing layer 12 having the layer numbers "6" to "8" is superposed by Step S13. In Embodiment 2, the data size of the superposition result in the first SoC 11 obtained by the superposition is the same as the data size of the one drawing layer.

In Step S14, the first communication unit 16 performs inter-SoC communication with the second communication unit 26 to transmit the superposition result in the first SoC 11 to the second SoC 21.

Steps S15 and S16 are performed in parallel with Steps S11 to S13.

In Step S15, the second drawing unit 23 draws a screen on one or more second drawing layers 22 of the second SoC 21 to which the remaining superposition sequence layer are allocated. In Step S16, the second layer superposition unit 24 acquires the second layer definition 27 from the second layer management unit 25.

In Step S17, the second communication unit 26 performs inter-SoC communication with the first communication unit 16 to receive the superposition result in the first SoC 11 transmitted from the first SoC 11.

In Step S18, the second layer management unit 25 stores the received superposition result in the first SoC 11 in one second drawing layer 22. For example, the second layer management unit 25 stores the superposition result in the second drawing layer 22 having a layer number same as the smallest layer number (layer number "6" in the example of FIG. 9) of the layer numbers of the consecutive superposition sequence layer cluster.

In Step S19, the second layer superposition unit 24 generates the output screen by superposing the stored superposition result in the first SoC 11 and the one or more drawn second drawing layers 22. In the example of FIG. 9, in Step S19, the superposition result in the first SoC 11 stored in the second drawing layer 22 having the layer number "6" (the superposition result of the layer numbers "6" to "8") and the second drawing layer 22 having the drawn layer numbers "2" and "4" are superposed.

In Step S20, the second layer superposition unit 24 outputs the generated output screen to the display deice 51. Then, the operation of FIG. 10 ends.

Conclusion of Embodiment 2

The screen generation device 1 according to Embodiment 2 as described above is configured similarly to the screen generation device 1 according to Embodiment 1; therefore, the inter-SoC communication volume can be reduced as in Embodiment 1.

Modification 1

Figure 11:
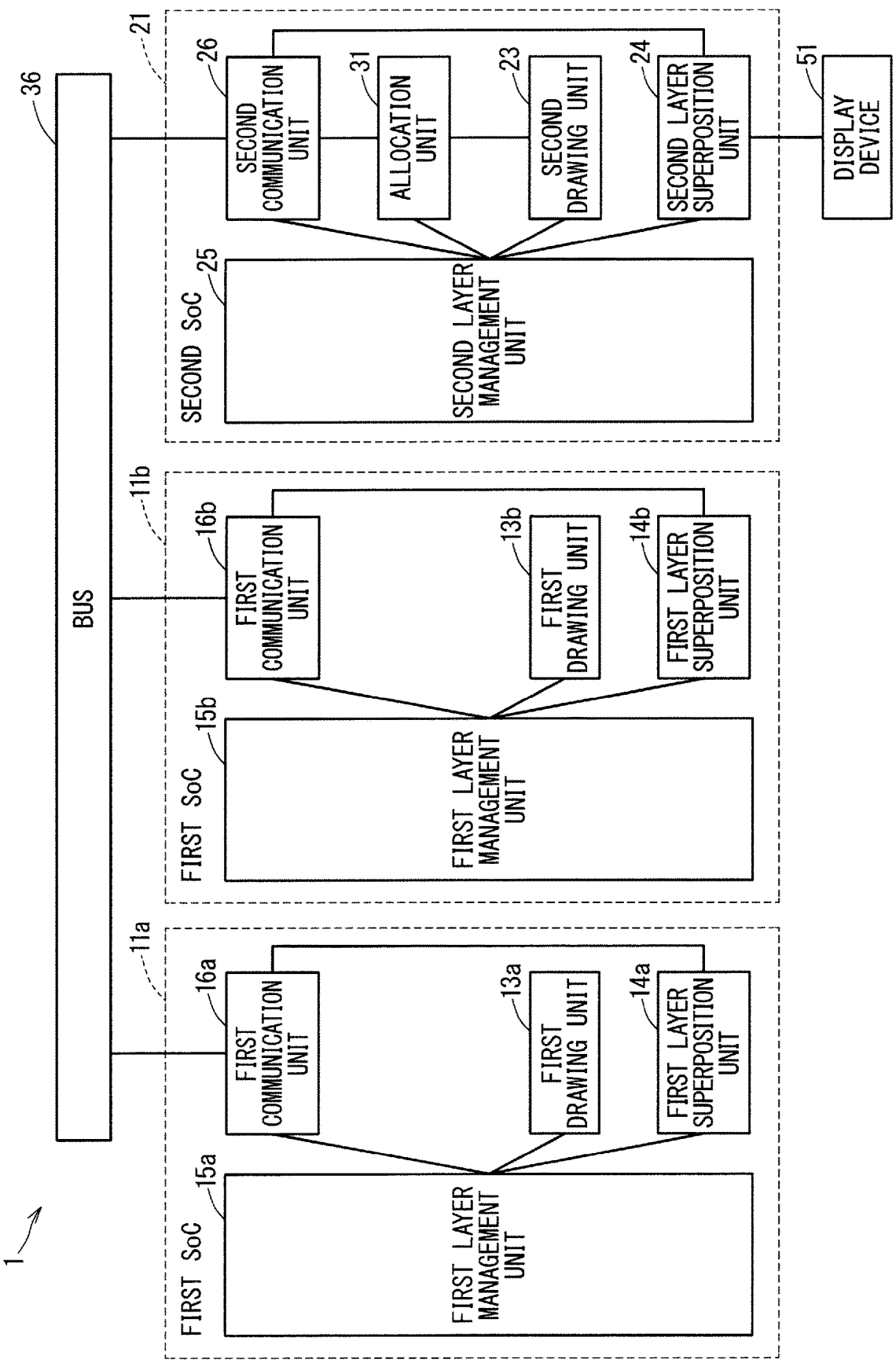
FIG. 11: A block diagram illustrating a configuration of a screen generation device according to Modification 1.

Although the number of the first SoCs 11 is one in Embodiment 2, a plurality of first SoCs 11 may also be provided. FIG. 11 is a block diagram illustrating a configuration of a screen generation device 1 according to Modification 1. The screen generation device 1 of FIG. 11 includes first SoCs 11a and 11b, and each of the first SoCs 11a and 11b is similar to the first SoC 11. That is, each of the first drawing units 13a and 13b, each of the first layer superposing units 14a and 14b, each of the first layer management units 15a and 15b, and each of the first communication units 16a and 16b are similar to the first drawing unit 13, the first layer superposing unit 14, the first layer management unit 15, and the first communication unit 16 described in Embodiment 2, respectively. Although not illustrated, each of the first layer management units 15a and 15b includes a plurality of first drawing layers 12 and a first layer definition 17, as in the first layer management unit 15.

Figure 12:
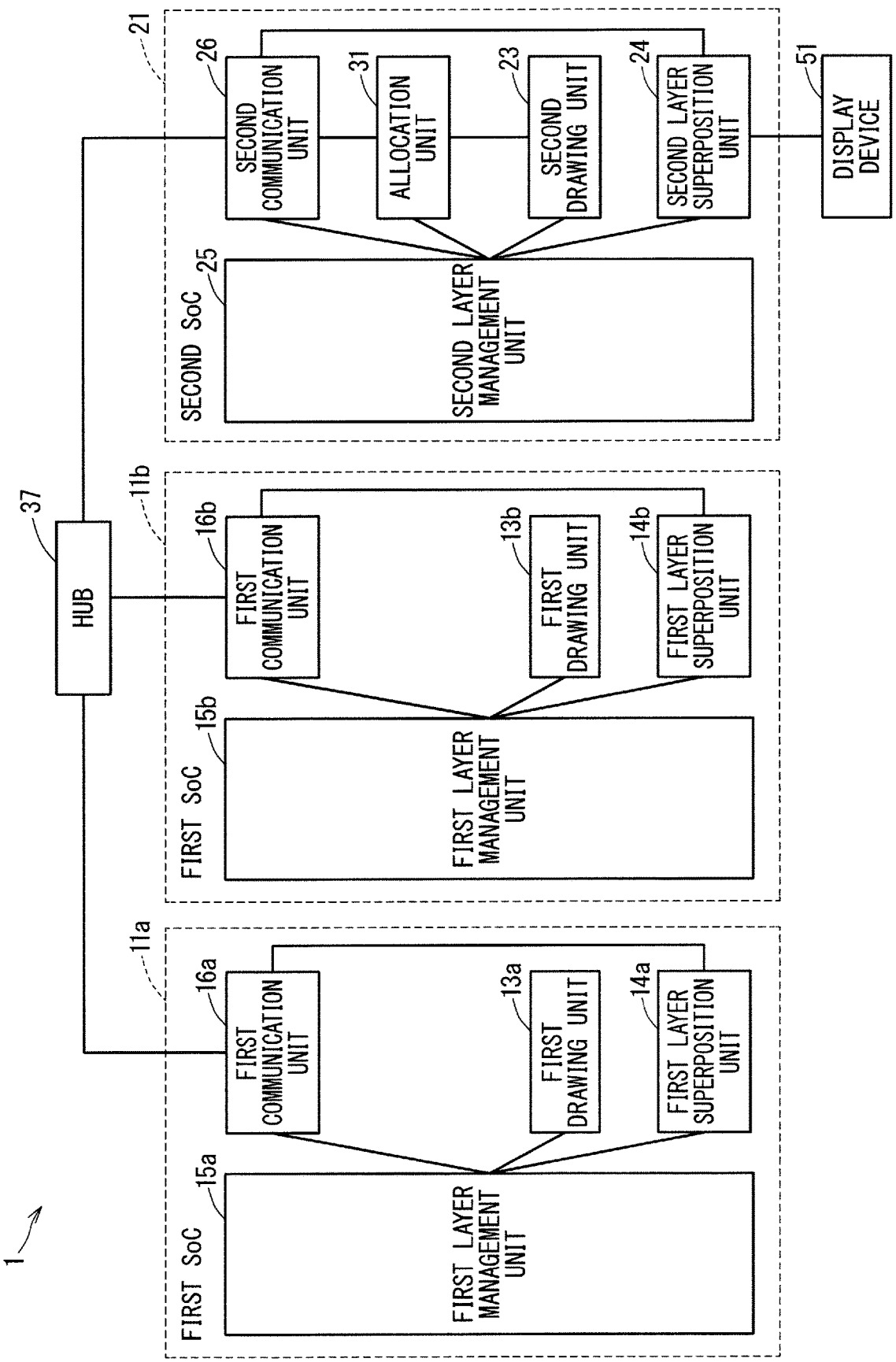
FIG. 12: A block diagram illustrating a configuration of a screen generation device according to Modification 1.

The second communication unit 26 of the second SoC 21 is capable of communicating with the first communication unit 16a of the first SoC 11a and the first communication unit 16b of the first SoC 11b via a bus 36. Note that communication means is not limited to the bus 36, for example, as illustrated in FIG. 12, the second communication unit 26 of the second SoC 21 is capable of communicating with the first communication unit 16a of the first SoC 11a and the first communication unit 16b of the first SoC 11b via a hub 37.

Next, of the operations of the screen generation device 1 according to Modification 1, main operations different from the operations of the screen generation device 1 according to Embodiment 2 illustrated in FIGS. 7 and 10 will be described. The determination process of Step S4 of FIG. 7 is performed for each of the first SoCs 11a and 11b. In the communication process of Step S14 of FIG. 10, when transmitting the superposition result in the first SoC 11 to the second SoC 21, each of the first communication units 16a and 16b also transmits the SoC number for distinguishing the first SoCs 11a and 11b from each other.

FIG. 13 is a table for illustrating the allocation by the allocation unit 31 according to Modification 1. In the example of FIG. 13, the SoC numbers "1A" and "1B" are assigned in the superposition sequence layers allocated to the first SoCs 11a and 11b, respectively, and the SoC number "2s" are assigned to the superposition sequence layer allocated to the second SoCs 21.

The allocation unit 31 allocates, among the plurality of superposition sequence layers, a plurality of consecutive superposition sequence layer clusters to the respective first SoCs 11a and 11b. In the example of FIG. 13, the allocation unit 31 allocates the consecutive superposition sequence layers having the layer numbers "2" to "4" in the superposition sequence to the first SoC 11a as a consecutive superposition sequence layer cluster, and the consecutive superposition sequence layers having the layer numbers 6" and "7" in the superposition sequence to the first SoC 11b as a consecutive superposition sequence layer cluster. Then, the allocation unit 31 allocates the superposition sequence layers having the layer numbers "1", "5", and "8" other than the consecutive superposition sequence layer cluster to the second SoC 21 as the remaining superposition sequence layers.

The inter-SoC communication volume can also be reduced in the screen generation device 1 according to above Modification 1, as in Embodiment 2.

Modification 2

In Embodiment 2, the example is described in which, in the first layer definition 17 and the second layer definition 27 of FIG. 6, the layer number for the new process, that is, the layer number added to the plurality of superposition sequence layers is the layer number "7". Here, it is assumed that the layer number for the new process is the layer number "5" instead of the layer number "7".

In this case, when the superposition sequence layer having the layer number "5" is allocated to the first SoC 11, the superposition sequence layers having the consecutive layer numbers "5", "6", and "8" in the superposition sequence are allocated as illustrated in FIG. 14. Meanwhile, when the superposition sequence layer having the layer number "5" is allocated to the second SoC 21, the superposition sequence layers having the consecutive layer numbers "6" and "8" in the superposition sequence are allocated as illustrated in FIG. 15.

In this manner, in either case of FIG. 14 or FIG. 15, the allocation unit 31 can allocate a consecutive superposition sequence layer cluster, that is, consecutive two or more superposition sequence layers in the superposition sequence to the first SoCs 11. That is, among the plurality of superposition sequence layers, the superposition sequence layer having the layer number "5" is one superposition sequence layer that can be included in either a consecutive superposition sequence layer cluster or a remaining superposition sequence layer, and that can be allocated to either one SoC or the other SoC in the first SoC 11 and the second SoC 21.

Based on the resource in use of the first SoC 11 and the resource in use of the second SoC 21, the allocation unit 31 according to Modification 2 allocates one superposition sequence layer like the superposition sequence layer having the layer number "5" to either the SoC 11 or the second SoC 21. The resources include, for example, the number of drawing layers and the usage rate of a Central Processing Unit (CPU).

For example, the allocation unit 31 may compare the number of drawing layers in use of the first SoC 11 with the number of drawing layers in use of the second SoC 21, and allocate the above one superposition sequence layer to either the first SoC 11 or the second SoC 21 with the smaller number of drawing layers in use. Also for example, the allocation unit 31 may compare the usage rate of the CPU of the first SoC 11 with the usage rate of the CPU of the second SoC 21, and allocate the above one superposition sequence layer to either the first SoC 11 or the second SoC 21 with the lower usage rate. With such a configuration, the use of resources can be evenly distributed, enabling to expect an improvement in the processing capacity of the entire screen generation device 1.

Modification 2 may be applied to Modification 1. That is, when it is possible for the allocation unit 31 to allocate one superposition sequence layer of the plurality of superposition sequence layers to any of the first SoC 11a and the first SoC 11b, the allocation unit 31 may allocate the one superposition sequence layer to any of the first SoC 11a and the first SoC 11b based on the resource in use of the first SoC 11a and the resource in use of the first SoC 11b.

Modification 3

In Embodiment 2, the allocation unit 31 performs allocation such that the SoC numbers of the first SoC 11 are consecutive in the superposition sequence, for the layer number for the new process (layer number "7" in the example of FIG. 6) in particular. However, it is not limited to this, and the allocation unit 31 may perform allocation such that the SoC numbers of the first SoC 11 are consecutive in superposition sequence, for the layer number for the existing process. Further, at this point, the allocation unit 31 may perform the allocation taking the resource in use into account, as in Modification 2.

Modification 4

Each superposition sequence layer of FIG. 2 or the like is selected from both the first drawing layers 12 and the second drawing layers 22. That is, the allocation units 31 according to Embodiments 1 and 2 allocate the consecutive superposition sequence layer cluster not only to the first drawing layers 12 but also to the second drawing layers 22, and allocate the remaining superposition sequence layer and the superposition result in the first SoC 11 not only to the second drawing layers but also to the first drawing layers.

In this case, for example, in FIG. 9, when the superposition sequence layers having the layer numbers "6" to "8" are allocated to the first drawing layers 12 as a consecutive superposition sequence layer cluster, the state is that the second drawing layers 22 having the layer numbers "6" to "8" are not available for the process. In the same manner, for example, in FIG. 9, when the superposition sequence layers having the layer numbers "2" and "4" are allocated to the second drawing layer 22 as remaining superposition sequence layers, the state is that the first drawing layers 12 having the layer numbers "2" and "4" are not available for the process.

Therefore, as illustrated in FIG. 16, each of the plurality of superposition sequence layers may also be selected from either the first drawing layers 12 or the second drawing layers 22.

In view of this, the allocation unit 31 according to Modification 4, it is configured that the allocation unit 31 allocates the consecutive superposition sequence layer cluster to the first drawing layers 12 without allocating to the second drawing layers 22, and allocates the remaining superposition sequence layer and the superposition result in the first SoC 11 to the second drawing layers 22 without allocating to the first drawing layers 12.

FIG. 16 is a table for illustrating the allocation by the allocation unit 31 according to Modification 4. In the example of FIG. 16, the consecutive superposition sequence layer cluster includes the superposition sequence layers having the layer numbers "8" to "10", "14" and "15", and is allocated to the first drawing layers having the layer numbers "1" to "3", "7" and "8". The remaining superposition sequence layers includes the superposition sequence layers having the layer numbers "1", "2", "6", and "7", and are allocated to the second drawing layers having the layer numbers "1", "2", "6", and "7". And the superposition result in the first drawing layers having the layer numbers "1" to "3", "7", and "8", that is, the superposition result of the first SoC 11, are allocated to the second drawing layer 22 having the layer number "8".

In the example of FIG. 9 as described above, the superposition sequence layers having the layer numbers "1" to "15" are defined without being superposed. As described above, according to Modification 4, the first drawing layers 12 and the second drawing layers 22 can be effectively used.

Embodiment 3

FIG. 17 is a block diagram illustrating a configuration of a screen generation device 1 according to Embodiment 3. Hereinafter, of the components according to Embodiment 3, the same or similar reference numerals are given to the same or similar components as those described above, and different components will be mainly described.

In Embodiment 3, the second SoC 21 of the screen generation device 1 is connected to a plurality of display devices 51 (display devices 51a and 51b), and the screen generation device 1 generates output screens for the plurality of display devices 51 (display devices 51a and 51b).

Further, each first drawing layer 12 of the first SoC 11 is assumed to have a storage size sufficient for screens before superposition to be simultaneously drawn with a sufficient resolution for the plurality of display devices 51. Accordingly, the first drawing unit 13 can draw screens before superposition on each first drawing layer 12 for one or more display devices 51, and the first layer superimposing unit 14 can collectively perform superposing processing on the one or more display devices 51.

FIG. 18 is a table illustrating an example of layer definition, that is, the first layer definition 17 and a second layer definition 27 according to Embodiment 3. The display device number is a number for identifying the plurality of display devices 51. In the example of FIG. 18, the screen for the display device 51a is drawn on the drawing layers having the layer numbers "6", and "8" which are set to the display device number "51A". On the other hand, the screens for the display device 51a and the display device 51b are drawn on the drawing layers having the layer numbers "2", "3", and "4" which are set to the display device numbers "51A" and "51B".

Figure 19:
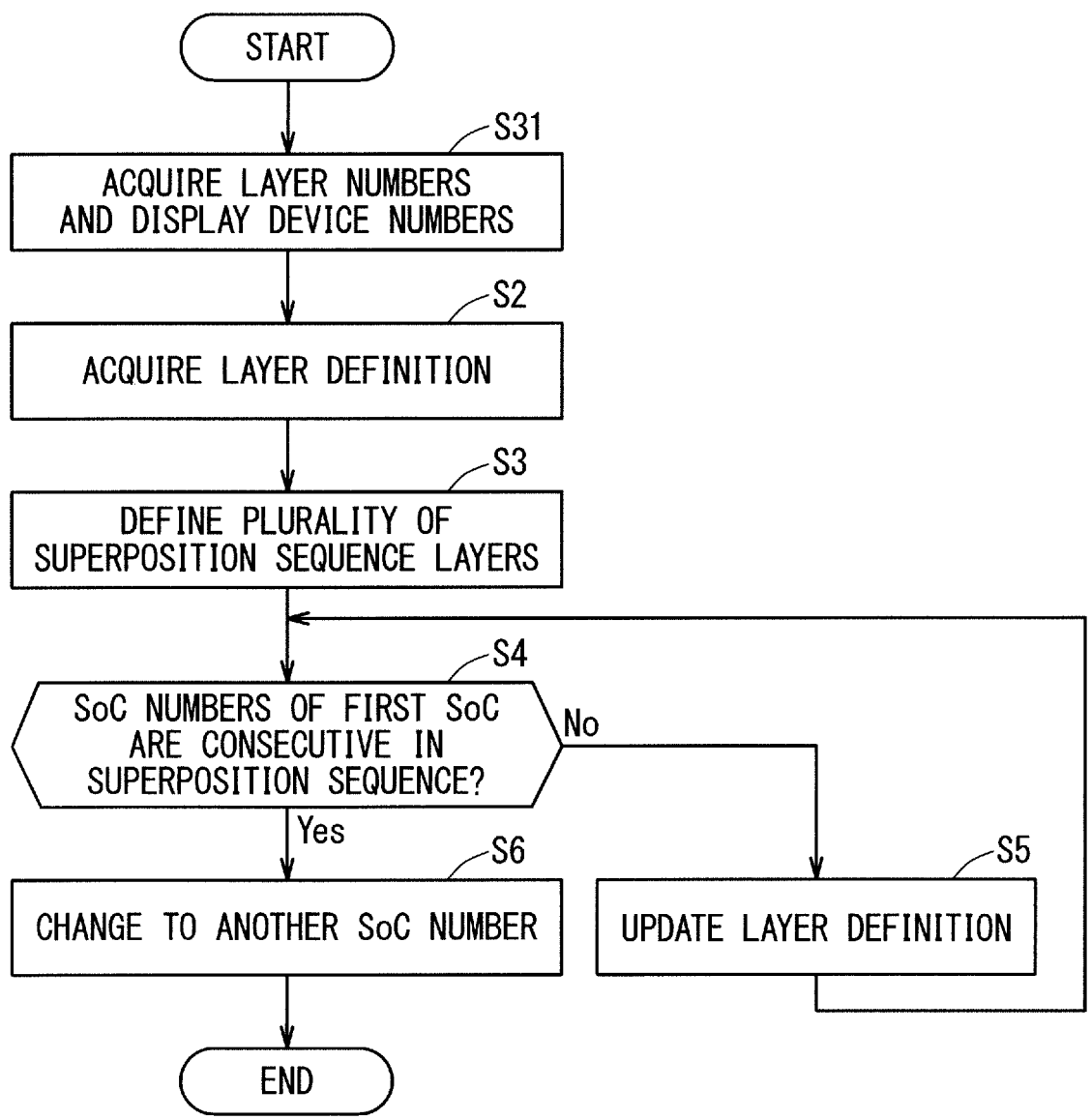
FIG. 19: A flowchart illustrating the operation of the screen generation device according to Embodiment 3.
Figure 20:
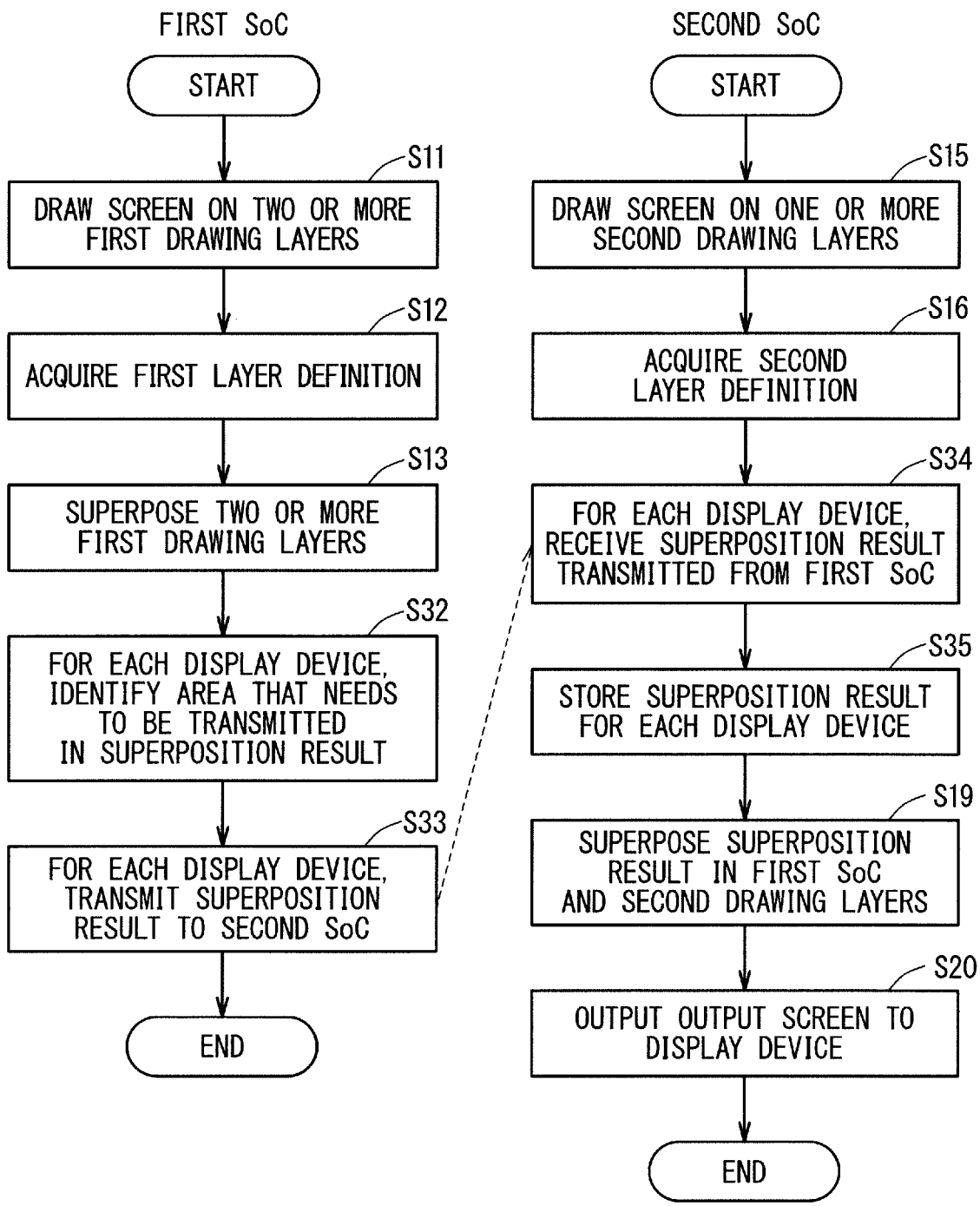
FIG. 20: A flowchart illustrating the operation of the screen generation device according to Embodiment 3.

FIGS. 19 and 20 are flowcharts illustrating the operation of the screen generation device 1 according to Embodiment 3. The flowchart of FIG. 19 is similar to a flowchart in which Step S1 in the flowchart of FIG. 7 is changed to Step S31. The flowchart of FIG. 20 is similar to a flowchart in which Step S32 is added to FIG. 10 and Steps S14, S17, and S18 of the flowchart of FIG. 10 are changed to Steps S33, S34, and S35. Therefore, in the following description, Steps S31 to S35 will be mainly described.

In Step S31 of FIG. 19, the allocation unit 31 acquires the layer numbers for the new process and also acquires the display device numbers of the plurality of display devices 51. Then, the same processes as Steps S2 to S13 of FIG. 10 are performed.

After Step S13 of FIG. 20, in Step S32, the first layer management unit 15 identifies, for each display device 51, an area that needs to be transmitted to the second SoC 21 in the superposition result in the first SoC 11.

Then, in Step S33, the first communication unit 16 performs the inter-SoC communication with the second communication unit 26 to transmit the superposition result in the first SoC 11 to the second SoC 21 for each display device 51. For example, when the layer definition is set as in FIG. 18 and when the screens of the display devices 51a and 51b are set to be superposed in the second SoC 21, the first communication unit 16 transmits the superposition result in the first SoC 11 to the second SoC 21. On the other hand, when a screen of another display device (not shown) other than the display devices 51a and 51b is set to be superposed in the second SoC 21, the transmission of the superposition result in the first SoC 11 is not performed.

After the same processes as Steps S15 and S16 of FIG. 10 are performed, in Step S34, the second communication unit 26 performs the inter-SoC communication with the first communication unit 16 to receive, for each display device 51, the superposition result in the first SoC 11 transmitted from the first SoC 11. In Step S35, the second layer management unit 25 stores the received superposition result in the first SoC 11 in one second drawing layer 22.

Then, the same processes as Step S19 onward are performed. When the layer definition is set as in FIG. 18, the second layer superposition unit 24 collectively performs the superposing processing for the display devices 51a and 51b in Step S19.

Conclusion of Embodiment 3

The above screen generation device 1 according to Embodiment 3 can reduce the data size of the inter-SoC communication per unit time. In addition, flexibility in processes such as drawing is enhanced.

Other Modification

Figure 21:
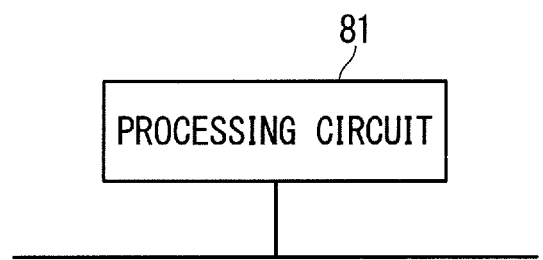
FIG. 21: A block diagram illustrating a hardware configuration of an allocation unit according to another Modification.

The allocation unit 31 described above is realized by a processing circuit 81 illustrated in FIG. 21. That is, the processing circuit 81 includes the allocation unit 31 configured to define a plurality of superposition sequence layers having a superposition sequence and selected from the plurality of first drawing layers 12 and the plurality of second drawing layers 22, allocate, among the plurality of superposition sequence layers, a consecutive superposition sequence layer cluster being consecutive two or more superposition sequence layers in the superposition sequence, to the first SoC 11, and allocate remaining superposition sequence layers being one or more superposition sequence layers other than the consecutive superposition sequence layer cluster to the second SoC 21. Dedicated hardware may be applied to the processing circuit 81, or a processor that executes a program stored in a memory may also be applied. For example, the processor corresponds to a central processing unit, a processing unit, an arithmetic unit, a microprocessor, a microcomputer, a Digital Signal Processor (DSP), or the like.

When the dedicated hardware is applied to the processing circuit 81, the processing circuit 81 corresponds to a single circuit, a composite circuit, a programmed processor, a parallel programmed processor, an Application Specific Integrated Circuit (ASIC), or a Field-Programmable Gate Array (FPGA), or the combination thereof. Each of the functions of the allocation unit 31 may be realized by each divided processing circuit of the processing circuit, or may be realized by one processing circuit with each of the functions of the respective parts are integrated.

When the dedicated hardware is applied to the processing circuit 81, the processing circuit 81 corresponds to a single circuit, a composite circuit, a programmed processor, a parallel programmed processor, an Application Specific Integrated Circuit (ASIC), or a Field-Programmable Gate Array (FPGA), or the combination thereof. Each of the functions of the allocation unit 31 may be realized by each divided processing circuit of the processing circuit, or may be realized by one processing circuit with each of the functions of the respective parts are integrated.

Figure 22:
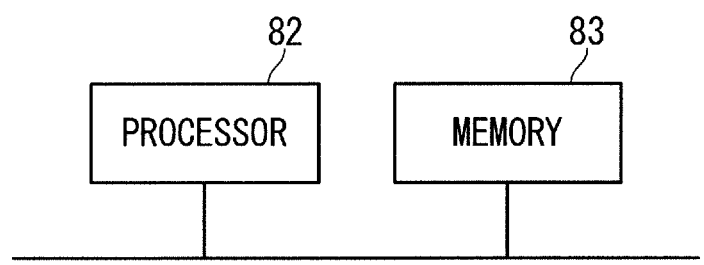
FIG. 22: A block diagram illustrating a hardware configuration of an allocation unit according to another Modification.

When the processing circuit 81 is a processor, the functions of the allocation unit 31 is realized by a combination with software or the like. Note that the software or the like corresponds to, for example, software, firmware, or software and firmware. The software or the like is described as a program and stored in a memory. As illustrated in FIG. 22, a processor 82 applied to the processing circuit 81 implements the functions of the allocation unit 31 by reading out and executing the program stored in a memory 83. That is, the screen generation device 1 includes the memory 83 for storing the program which, eventually, executes a step of defining a plurality of superposition sequence layers having a superposition sequence and selected from the plurality of first drawing layers 12 and the plurality of second drawing layers 22, allocating, among the plurality of superposition sequence layers, a consecutive superposition sequence layer cluster being consecutive two or more superposition sequence layers in the superposition sequence, to the first SoC 11, and allocating remaining superposition sequence layers being one or more superposition sequence layers other than the consecutive superposition sequence layer cluster to the second SoC 21. In other words, it can be said that the program causes a computer to execute the procedure and method of the allocation unit 31. Here, the memory 83 may be, for example, a non-volatile or volatile semiconductor memory, such as a random access memory (RAM), a read only memory (ROM), a flash memory, an erasable programmable read only memory (EPROM), an electrically erasable programmable read only memory (EEPROM), or the like, a hard disk drive (HDD), a magnetic disk, a flexible disk, an optical disk, a compact disk, a mini disk, a digital versatile disc (DVD) and a drive device therefor, or any storage medium used in the future.

The configuration in which each function of the allocation unit 31 is realized by either hardware or software has been described above. However, the present invention is not limited thereto, and a configuration in which part of the allocation unit 31 is realized by dedicated hardware and another part is realized by software or the like may be adoptable. As described above, the processing circuit 81 can realize the functions described above by hardware, software, or the like, or a combination thereof.

It should be noted that Embodiments and Modification of the present invention can be arbitrarily combined and can be appropriately modified or omitted without departing from the scope of the invention.

While the invention has been described in detail, the forgoing description is in all aspects illustrative and not restrictive. It is understood that numerous other modifications and variations can be devised without departing from the scope of the invention.

EXPLANATION OF REFERENCE SIGNS

1 screen generation device, 11,11a,11b first SoC, 12, 12-1 to 12-n first drawing layer, 13 first drawing unit, 14 first layer superposition unit, 21 second SoC, 22, 22-1 to 22-n second drawing layer, 23 second drawing unit, 24 second layer superposition unit, 31 allocation unit, 51,51a, 51b display device.

The invention claimed is:
1. A screen generation device configured to generate an output screen which is a screen output to a display device, comprising:
   at least one first SoC including a plurality of first drawing layers for drawing a screen being a part of the output screen;
   a second SoC including a plurality of second drawing layers for drawing a screen being a part of the output screen and configured to be capable of communication with the at least one first SoC; and
   an allocation circuitry configured to define a plurality of superposition sequence layers having a superposition sequence and selected from the plurality of first drawing layers and the plurality of second drawing layers, allocate, among the plurality of superposition sequence layers, a consecutive superposition sequence layer cluster being consecutive two or more superposition sequence layers in the superposition sequence, to the first SoC, and allocate remaining superposition sequence layers being one or more superposition sequence layers other than the consecutive superposition sequence layer cluster to the second SoC, wherein the at least one first SoC includes a first drawing circuitry configured to draw a screen on two or more first drawing layers of the first SoC to which the consecutive superposition sequence layer cluster is allocated, and a first layer superposition circuitry configured to superpose the two or more first drawing layers drawn by the first drawing circuitry, and the second SoC includes a second drawing circuitry configured to draw a screen on one or more second drawing layers of the second SoC to which the remaining superposition sequence layers are allocated, and a second layer superposition circuitry configured to generate the output screen by superposing a superposition result in the first SoC transmitted from the at least one first SoC via the communication and the one or more second drawing layers drawn by the second drawing circuitry.

2. The screen generation device according to claim 1, wherein the at least one first SoC includes a plurality of first SoCs, and the allocation circuitry is configured to allocate, among the plurality of superposition sequence layers, the plurality of consecutive superposition sequence layer clusters to the respective first SoCs.

3. The screen generation device according to claim 1, wherein the allocation circuitry is configured to allocate, among the plurality of superposition sequence layers, one superposition sequence layer that can be included in either the consecutive superposition sequence layer cluster or the remaining superposition sequence layers, and that can be allocated to either one SoC or an other SoC in the first SoC and the second SoC to any of the one SoC and the other SoC based on a resource in use of the one SoC and a resource in use of the other SoC.

4. The screen generation device according to claim 1, wherein the allocation circuitry is configured to allocate the consecutive superposition sequence layer cluster not only to the first drawing layers but also to the second drawing layers and allocate the remaining superposition sequence layers and the superposition result in the first SoC not only to the second drawing layers but also to the first drawing layers.

5. The screen generation device according to claim 1, wherein the screen generation device is configured to generate the output screen for a plurality of the display device, and the at least one first SoC is configured to transmit the superposition result in the first SoC to the second SoC for each display device.

6. A screen generation method of a screen generation device configured to generate an output screen which is a screen output to a display device, wherein the screen generation device includes at least one first SoC including a plurality of first drawing layers for drawing a screen being a part of the output screen, and a second SoC including a plurality of second drawing layers for drawing a screen being a part of the output screen and configured to be capable of communication with the at least one first SoC, the screen generation method comprising the steps of:

defining a plurality of superposition sequence layers having a superposition sequence and selected from the plurality of first drawing layers and the plurality of second drawing layers, allocating, among the plurality of superposition sequence layers, a consecutive superposition sequence layer cluster being consecutive two or more superposition sequence layers in the superposition sequence, to the first SoC, and allocating remaining superposition sequence layers being one or more superposition sequence layers other than the consecutive superposition sequence layer cluster to the second SoC;

the at least one first SoC drawing a screen on two or more first drawing layers of the first SoC to which the consecutive superposition sequence layer cluster is allocated and superposing the two or more drawn first drawing layers; and the second SoC drawing a screen on one or more second drawing layers of the second SoC to which the remaining superposition sequence layers are allocated and generating the output screen by superposing a superposition result in the first SoC transmitted from the at least one first SoC via the communication and the one or more drawn second drawing layers.

\* \* \* \* \*